Aug. 19, 1924.
J. W. MART
1,505,272
REENFORCED RUBBER COMPOSITION STRIP
Filed Feb. 14, 1924
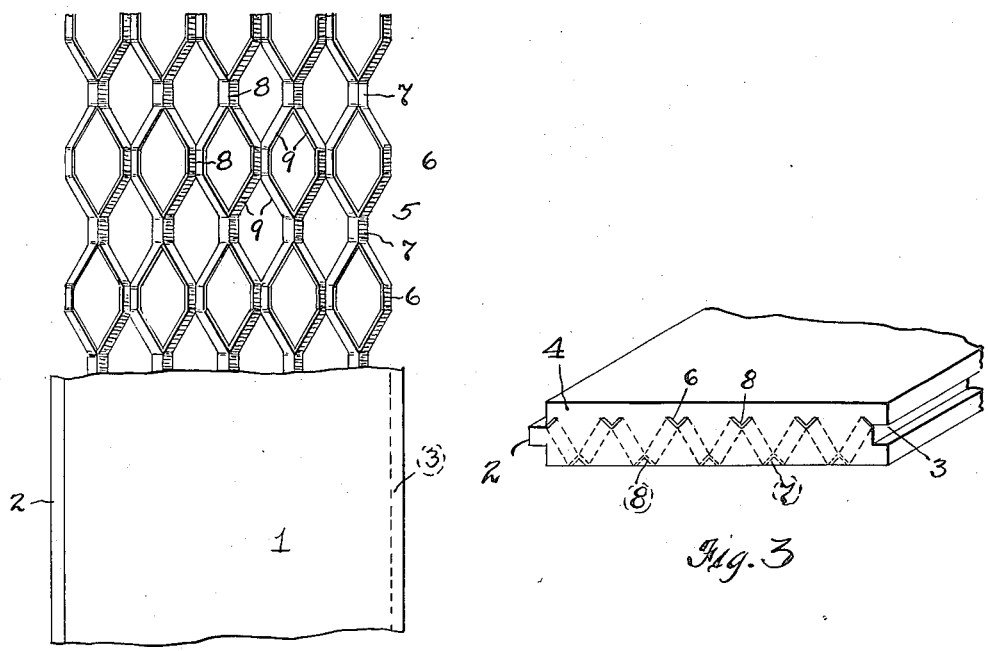
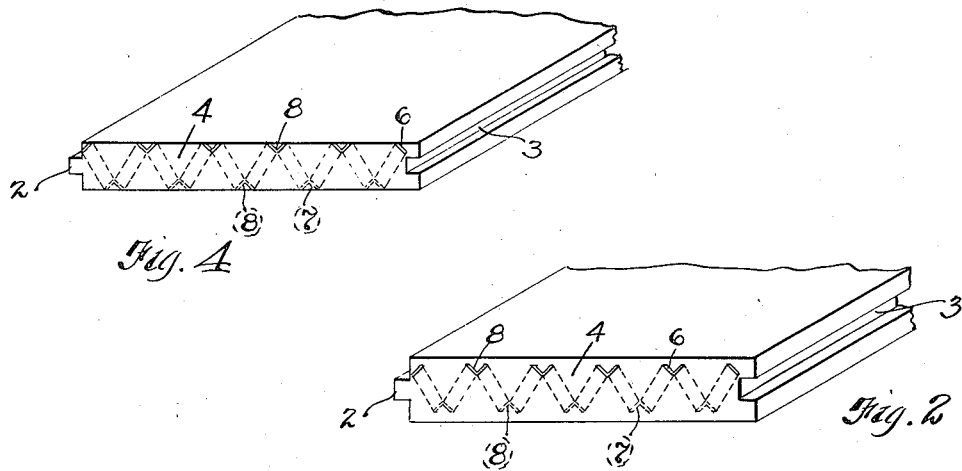
INVENTOR.
John W. Mart.
BY
Fay, Oberlin & Fay
ATTORNEYS Patented Aug. 19, 1924.

1,505,272

UNITED STATES PATENT OFFICE.

JOHN W. MART, OF CLEVELAND HEIGHTS, OHIO, ASSIGNOR OF ONE-HALF TO G. FRANK HORN, OF ELYRIA, OHIO.

REENFORCED-RUBBER-COMPOSITION STRIP.

Application filed February 14, 1924. Serial No. 692,836.

*To all whom it may concern:*

Be it known that I, JOHN W. MART, a citizen of the United States, and a resident of Cleveland Heights, county of Cuyahoga, and State of Ohio, have invented a new and useful Improvement in Reenforced-Rubber-Composition Strips, of which the following is a specification, the principle of the invention being herein explained and the best mode in which I have contemplated applying that principle, so as to distinguish it from other inventions, This invention comprises a reinforced rubber composition strip. More particularly it relates to a strip for use in buildings, in places where waterproof or moisture-proof characteristics are desired or where a semi-resilient surface is of advantage. The strips are especially adapted for use as flooring strips or to form waterproof walls or wainscoting for bathrooms and the like. The strips are also suitable for use as roofing particularly for garages and buildings of similar character.

The principal object of the invention is to supply standard strips having unusual wearing qualities and resistance to moisture and capable of use upon an economical basis in substitution for tiling and more expensive methods of providing waterproof and moisture-proof structures of the character referred to. A further object of the invention is to provide a composition of this character unaffected by changes in temperature and peculiarly adapted to resist deformation and wear, though at the same time provided with a certain degree of resiliency. Other objects of the invention will appear in the course of the following description.

The annexed drawing and the following description set forth in detail certain structural features embodying the invention, such disclosed means constituting, however, but one of various structural forms in which the principle of the invention may be used.

In said annexed drawing:—

Fig. 1 is a plan view partially in section showing the improved composition strip with the expanded metal insert therein;

Fig. 2 is a fragmentary perspective view of an end of the preferred form of strip;

Fig. 3 is a fragmentary perspective view of an end of a modified form of strip; and Fig. 4 is a fragmentary perspective view of an end of still another modified form of strip.

As is clearly shown in the drawing, the composition strips 1 are of a cross-section corresponding to that found in flooring material used in the building trades. The longitudinal edges of said flooring strips may be provided with a rabbeted tongue 2 and groove 3 so that adjoining strips may be matched and interlocked with each other. The body 4 of the strips is formed of rubber scrap, reclaimed stock, and similar waste rubber material and is placed about an expanded metal reinforcing strip 5 prior to being subjected to heavy pressure and the necessary degree of heat to produce a body having the desired characteristics as to texture and resiliency. A strip of expanded metal of the type clearly illustrated in the drawing has been found to present many advantages for the use herein described. In said strip there are provided in adjacent transverse rows alternately raised and depressed expanded sections 6 and 7 presenting an undulating appearance as viewed from the side or end. At the points of juncture of the several open loops, the connecting webs and adjacent structure form seats or supports 8 turned upwardly and downwardly respectively. The side members 9 of the individual expanded loops are inclined at an angle of forty-five degrees toward or away from each other alternately in adjacent longitudinal rows.

Thus the reinforcing strip will be found to present longitudinal and transverse bracing throughout the body of the strip thus distributing stresses applied in a plane adjacent the upper surface along a plane adjacent the lower surface. All tendency of the rubber composition to warp or creep will be resisted and where said strips are used over a protracted period as flooring, the individual strips will merely have their side and end portions forced into closer contact with the adjacent strips.

In the form of construction shown in Fig. 2, the reinforcing strip occupies an intermediate position between the upper and lower surfaces of the strip and thus said strip may be used on either side where a plain surface free from protruding metal edges is desired.

The form illustrated in Fig. 3 is intended to provide a heavier layer of stock above the upper plane of the reinforcing strip and the extreme lower edges of said reinforcing strip lie in the plane of the lower surface of the structure.

In the form of construction shown in Fig. 4, the extreme upper and lower edges of the reinforcing material lie in the planes respectively of the top and bottom of the construction. This form of the reenforced strip is intended particularly for heavy use, as in factory wash rooms and the like where the edges projecting in spaced transverse rows serve as a species of armor for the flooring but at the same time do not occupy any appreciable amount of surface area or diminish to any great extent the effectiveness of the flooring from the standpoint of being thoroughly sanitary and semi-resilient and noiseless.

When the strips are intended for use as flooring, they may be made in the standard lengths and widths of wood flooring, but where their use for other purposes is in view, suitable changes in the size of the units employed will be made.

Other modes of applying the principle of my invention may be employed instead of the one explained, change being made as regards the structure herein disclosed, provided the means stated by any of the following claims or the equivalent of such stated means be employed.

I therefor particularly point out and distinctly claim as my invention:—

1. A composition flooring strip of substantially rectangular cross section comprising a semi-rigid body formed of rubber compound and having embedded therein a strip of expanded metal for reinforcing purposes, said expanded metal strip having longitudinal undulations alternately approaching the respective top and bottom surfaces of said strip at spaced intervals throughout the length thereof and adapted to be elongated in the plane of the flooring.

2. A composition flooring strip of substantially rectangular cross section comprising a semi-rigid body formed of rubber compound and having embedded therein a strip of expanded metal for reinforcing purposes, said expanded metal strip having transverse undulations alternately approaching the respective top and bottom surfaces of said strip at spaced intervals respectively throughout the length of said strip and adapted to be elongated in the plane of the flooring.

3. A composition flooring strip of substantially rectangular cross section comprising a semi-rigid body formed of rubber compound and having embedded therein a strip of expanded metal for reinforcing purposes, the upper and lower portions of which comprise V-shaped seats with their open portions directed toward the adjacent surfaces of said composition strip and the intermediate portions of which comprise side members inclined at an angle toward or away from each other alternately in adjacent longitudinal rows adapting said expanded metal strip to be elongated in the plane of the flooring.

4. A composition flooring strip of substantially rectangular cross section comprising a semi-rigid body formed of rubber compound and having embedded therein a strip of expanded metal for reinforcing purposes, the upper and lower portions of which comprise V-shaped seats with their open portions directed toward the adjacent surfaces of said composition strip and the intermediate portions of which comprise side members inclined at an angle of forty-five degrees toward or away from the planes of the faces of the strip alternately in adjacent longitudinal rows adapting said expanded metal strip to be elongated in the plane of the flooring.

Signed by me, this 31st day of January, 1924.

JOHN W. MART.